United States Patent
Matsuoka et al.

(10) Patent No.: US 10,562,343 B2
(45) Date of Patent: Feb. 18, 2020

(54) WHEEL COVER FOR VEHICLE, DRIVE UNIT FOR VEHICLE AND VEHICLE

(71) Applicant: Toyota Jidosha Kabushiki Kaisha, Toyota-shi, Aichi-ken (JP)

(72) Inventors: Tomohito Matsuoka, Nagoya (JP); Seiichi Tsunoda, Nisshin (JP); Jiro Goto, Seto (JP); Masayuki Yamada, Chofu (JP); Yasutaka Eto, Okazaki (JP); Keima Fukunaga, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/223,664

(22) Filed: Dec. 18, 2018

(65) Prior Publication Data

US 2019/0193462 A1 Jun. 27, 2019

(30) Foreign Application Priority Data

Dec. 26, 2017 (JP) .................. 2017-249587

(51) Int. Cl.
| | |
|---|---|
| *B60B 7/20* | (2006.01) |
| *B60B 7/00* | (2006.01) |
| *B60K 7/00* | (2006.01) |
| *B60Q 1/32* | (2006.01) |
| *B60Q 1/34* | (2006.01) |

(52) U.S. Cl.
CPC .............. *B60B 7/20* (2013.01); *B60B 7/0033* (2013.01); *B60B 7/0086* (2013.01); *B60K 7/0007* (2013.01); *B60Q 1/326* (2013.01); *B60Q 1/34* (2013.01); *B60B 2900/3312* (2013.01); *B60Y 2200/91* (2013.01)

(58) Field of Classification Search
CPC ....... B60B 7/20; B60B 7/0033; B60B 7/0086; B60Q 1/326; B60Q 1/34; B60Q 1/343; B60Q 1/346; B60Q 1/36; B60Q 1/38; B60Q 1/382; B60Q 1/385; B60Q 1/387; B60K 7/0007
See application file for complete search history.

(56) References Cited

U.S. PATENT DOCUMENTS

| | | | |
|---|---|---|---|
| 3,005,906 A | 10/1961 | Butler | |
| 6,536,848 B1 | 3/2003 | Goodman | |
| 6,637,830 B1 * | 10/2003 | Burgess | .............. B60B 7/20 301/37.109 |

(Continued)

FOREIGN PATENT DOCUMENTS

| | | |
|---|---|---|
| EP | 0947357 A1 | 10/1999 |
| JP | 30-11603 Y1 | 8/1955 |

(Continued)

*Primary Examiner* — Kip T Kotter
(74) *Attorney, Agent, or Firm* — Dinsmore & Shohl LLP

(57) ABSTRACT

Disclosed is a wheel cover for a vehicle. The wheel cover is supported to be relatively rotatable with rotation of a wheel having a tire attached to an outer periphery of the wheel. The wheel cover has a shape indicating a moving direction of a vehicle or a figure indicating the moving direction of the vehicle outward in a vehicle width direction, and is configured to be turned by an actuator such that, when the moving direction of the vehicle is changed, the shape or the figure indicates the moving direction of the vehicle.

10 Claims, 12 Drawing Sheets

(56) References Cited

U.S. PATENT DOCUMENTS

| | | | |
|---|---|---|---|
| 8,382,209 B2 * | 2/2013 | Yin | B60B 7/20 |
| | | | 301/37.25 |
| 8,967,840 B1 | 3/2015 | Haney | |
| 2006/0158050 A1 | 7/2006 | Maeda et al. | |
| 2010/0038956 A1 | 2/2010 | Byers et al. | |
| 2017/0297482 A1 * | 10/2017 | Salter | B60Q 1/2696 |

FOREIGN PATENT DOCUMENTS

| | | |
|---|---|---|
| JP | 31-1014 Y1 | 1/1956 |
| JP | H04002503 A | 1/1992 |
| JP | H09156301 A | 6/1997 |
| JP | 2002-186119 A | 6/2002 |
| JP | 2006-248495 A | 9/2006 |
| JP | 2008-001300 A | 1/2008 |
| JP | 2009-126315 A | 6/2009 |
| JP | 2011-013436 A | 1/2011 |
| JP | 2011162193 A | 8/2011 |
| JP | 2012-030678 A | 2/2012 |
| KR | 200370585 Y1 | 12/2004 |
| WO | 2017079349 A1 | 5/2017 |

\* cited by examiner

WHEEL COVER FOR VEHICLE, DRIVE UNIT FOR VEHICLE AND VEHICLE

CROSS-REFERENCE TO RELATED APPLICATIONS

This application claims priority to Japanese Patent Application No. 2017-249587 filed on Dec. 26, 2017, which is incorporated herein by reference in its entirety including the specification, drawings and abstract.

BACKGROUND

1. Technical Field

The present disclosure relates to a wheel cover for a vehicle, a drive unit for a vehicle and a vehicle.

2. Description of Related Art

An eight-wheel drive electric vehicle in which a tire-wheel assembly set having two tire-wheel assemblies each incorporated with an in-wheel motor and disposed in parallel in a moving direction of the vehicle is disposed at each of four corners of a vehicle body and a floor of a vehicle cabin is made fully flat has been suggested (for example, see Japanese Unexamined Patent Application Publication No. 2002-186119 (JP 2002-186119 A)). A wheel cap that is attached to be relatively rotatable with respect to a wheel cap body mounted with an in-wheel motor, makes a center cap be maintained in a predetermined direction without being rotated even though the wheel cap body is rotated, and enables identification of a figure or a character displayed on an outer surface of the wheel cap has been suggested (for example, see Japanese Unexamined Patent Application Publication No. 2012-030678 (JP 2012-030678 A)).

SUMMARY

On the other hand, a vehicle in which an appearance design is made front-rear symmetric using an in-wheel motor has been examined. However, when the appearance design of the vehicle is made front-rear symmetric, a person who is outside the vehicle may hardly be able to discriminate a traveling direction of the vehicle. In the related art described in JP 2012-030678 A, the figure or the like displayed on the wheel cap is maintained in the given direction and is made recognizable regardless of the rotation of the wheel; however, it is difficult to indicate a moving direction of the vehicle.

The disclosure provides a wheel cover for a vehicle capable of displaying a moving direction of a vehicle, a drive unit for a vehicle and a vehicle.

A first aspect of the disclosure relates to a wheel cover for a vehicle. The wheel cover is supported to be relatively rotatable with rotation of a wheel having a tire attached to an outer periphery of the wheel. The wheel cover has a shape indicating a moving direction of a vehicle or a figure indicating the moving direction of the vehicle outward in a vehicle width direction. The wheel cover is configured to be turned by an actuator such that, when the moving direction of the vehicle is changed, the shape or the figure indicates the moving direction of the vehicle.

According to the first aspect of the disclosure, the shape of the wheel cover or the figure outward in the vehicle width direction can be retained in a state of being rotated so as to indicate the moving direction of the vehicle regardless of the rotation of the wheel. Accordingly, it is possible to display the moving direction of the vehicle with the shape of the wheel cover or the figure, and to allow a person who is outside the vehicle to easily determine the moving direction of the vehicle.

The wheel cover according to the first aspect of the disclosure may further include an intake port into which air flows, and an intake air flow passage configured to introduce air flowing from the intake port into a space inward of the tire. The wheel cover may be configured to be turned such that, when the moving direction of the vehicle is changed, the intake port is positioned in the moving direction of the vehicle and the shape or the figure indicates the moving direction of the vehicle.

According to the first aspect of the disclosure, when the vehicle moves, cooling air is introduced from the intake port in the moving direction of the vehicle into the space inward of the tire, whereby it is possible to effectively cool the inside of the wheel inward of the tire, a brake pad, or the like, and to allow a person who is outside the vehicle to easily determine the moving direction of the vehicle.

In the wheel cover according to the first aspect of the disclosure, the wheel may be present around a shaft non-rotatably attached to a vehicle body of the vehicle and may be rotatable. The wheel cover may be present around the shaft and may be configured to be turned by the actuator fixed to the shaft.

According to the first aspect of the disclosure, it is possible to support the wheel cover for a vehicle to be relatively rotatable with the rotation of the wheel with a simple configuration.

A second aspect of the disclosure relates to a drive unit for a vehicle. The drive unit includes a bottomed cylindrical wheel, an in-wheel motor, and a wheel cover for a vehicle. The wheel includes cylindrical rim, and a disc in contact with one end portion of the rim in an axial direction. A tire is attached to an outer periphery of the rim. The in-wheel motor is present in an internal space outward of the disc in the vehicle width direction. The wheel cover is present outward of the in-wheel motor in the vehicle width direction and is supported to be relatively rotatable with rotation of the wheel. The wheel cover has a shape indicating a moving direction of a vehicle or a figure indicating the moving direction of the vehicle outward in the vehicle width direction. The wheel cover is configured to be turned by an actuator such that, when the moving direction of the vehicle is changed, the shape or the figure indicates the moving direction of the vehicle.

According to the second aspect of the disclosure, in the drive unit using the in-wheel motor, the shape of the wheel cover or the figure outward in the vehicle width direction can be retained in a state of being rotated so as to indicate the moving direction of the vehicle regardless of the rotation of the wheel. Accordingly, it is possible to display the moving direction of the vehicle with the shape of the wheel cover or the figure, and even in a vehicle in which the drive unit for a vehicle using the in-wheel motor is mounted, to allow a person who is outside the vehicle to easily determine the moving direction of the vehicle.

In the drive unit according to the second aspect of the disclosure, the wheel cover may have an intake port into which air flows, and an intake air flow passage configured to introduce air flowing from the intake port into an internal space of the wheel. The wheel cover may be configured to be turned such that, when the moving direction of the vehicle is changed, the intake port is positioned in the moving direction of the vehicle and the shape or the figure indicates the moving direction of the vehicle.

According to the second aspect of the disclosure, when the vehicle moves, cooling air is introduced from the intake port in the vehicle moving direction into the internal space of the wheel. Accordingly, it is possible to effectively cool the in-wheel motor in the internal space of the wheel and to allow a person who is outside the vehicle to easily determine the moving direction of the vehicle.

In the drive unit according to the second aspect of the disclosure, the wheel may be present around a shaft non-rotatably attached to a vehicle body of the vehicle and may be rotatable. The in-wheel motor may be fixed to the shaft and may be configured to rotationally drive the wheel. The wheel cover may be present around the shaft and may be configured to be turned by the actuator fixed to the shaft.

According to the second aspect of the disclosure, in the drive unit for a vehicle using the in-wheel motor, it is possible to support the wheel cover for a vehicle to be relatively rotatable with the rotation of the wheel with a simple configuration.

A third aspect of the disclosure relates to a drive unit for a vehicle. The drive unit includes a bottomed cylindrical wheel, an in-wheel motor, and a wheel cover for a vehicle. The wheel includes cylindrical rim, and a disc in contact with one end portion of the rim in an axial direction. A tire is attached to an outer periphery of the rim. The in-wheel motor is present in an internal space outward of the disc in the vehicle width direction. The wheel cover is present outward of the in-wheel motor in the vehicle width direction and is non-rotatably supported. The wheel cover has a louver configured to be able to change a direction of an opening, and an intake air flow passage configured to introduce air flowing from the opening into an internal space of the wheel. The louver has, on a front surface and a rear surface, a figure indicating a moving direction of a vehicle. The wheel cover is configured to change the direction of the opening with an actuator such that, when the moving direction of the vehicle is changed, the direction of the opening is positioned in the moving direction of the vehicle and the figure indicates the moving direction of the vehicle.

According to the third aspect of the disclosure, in the drive unit for a vehicle using the in-wheel motor, it is possible to retain the opening direction of the louver in a state of displaying the figure indicating the moving direction of the vehicle regardless of the rotation of the wheel. Accordingly, it is possible to display the moving direction of the vehicle with the figure in the louver. When the vehicle moves, cooling air is introduced from the opening in the vehicle moving direction into the internal space of the wheel. Accordingly, it is possible to effectively cool the in-wheel motor in the internal space of the wheel.

In the drive unit according to the third aspect of the disclosure, the wheel may be present around a shaft non-rotatably attached to a vehicle body of the vehicle and may be rotatable. The in-wheel motor may be fixed to the shaft and may be configured to rotationally drive the wheel. The wheel cover and the actuator may be fixed to the shaft. The louver may be configured such that the direction of the opening is changed by the actuator.

According to the third aspect of the disclosure, in the drive unit for a vehicle using the in-wheel motor, it is possible to support the wheel cover for a vehicle to be not rotatable even though the wheel is rotated, and to retain the opening direction of the louver in a state of displaying the figure indicating the moving direction of the vehicle. Accordingly, the opening direction of the louver is changed, whereby it is possible to display the moving direction of the vehicle with the figure in the louver.

A fourth aspect of the disclosure relates to a vehicle. The vehicle includes a vehicle body and a wheel cover. The wheel cover is supported to be relatively rotatable with rotation of a wheel having a tire attached to an outer periphery of the wheel. The wheel cover has a shape indicating a moving direction of the vehicle or a figure indicating the moving direction of the vehicle outward in a vehicle width direction. The wheel cover is configured to be turned by an actuator such that, when a moving direction of the vehicle is changed, the shape or the figure indicates the moving direction of the vehicle. The vehicle body has a front-rear symmetrical appearance design.

According to the fourth aspect of the disclosure, it is possible to retain the shape of the wheel cover or the figure in a state of being rotated so as to indicate the moving direction of the vehicle regardless of the rotation of the wheel. Accordingly, it is possible to display the moving direction of the vehicle with the shape of the wheel cover or the figure, and even in a vehicle having a front-rear symmetry, to allow a person who is outside the vehicle to easily determine the moving direction of the vehicle.

In the vehicle according to the fourth aspect of the disclosure, the wheel may be present around a shaft non-rotatably attached to the vehicle body and may be rotatable. The wheel cover may be present around the shaft and may be configured to be turned by the actuator fixed to the shaft.

According to the fourth aspect of the disclosure, in the vehicle, it is possible to support the wheel cover for a vehicle to be relatively rotatable with the rotation of the wheel with a simple configuration.

A fifth aspect of the disclosure relates to a wheel cover for a vehicle. The wheel cover includes a display unit. The display unit is configured to display an image indicating a moving direction of a vehicle outward in a vehicle width direction. The wheel cover is supported to be relatively rotatable with rotation of a wheel having a tire attached to an outer periphery of the wheel. In the wheel cover according to the fifth aspect of the disclosure, the wheel may be present around a shaft non-rotatably attached to a vehicle body of the vehicle and may be rotatable. The wheel cover may be fixed to the shaft.

According to the fifth aspect of the disclosure, the display unit can be retained in the predetermined direction regardless of the rotation of the wheel. Accordingly, the image indicating the moving direction of the vehicle is displayed in the display unit, whereby it is possible to display the moving direction of the vehicle and to allow a person who is outside the vehicle to easily determine the moving direction of the vehicle.

The disclosure can provide a wheel cover for a vehicle capable of displaying a moving direction of a vehicle, and a drive unit for a vehicle and a vehicle including a wheel cover for a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
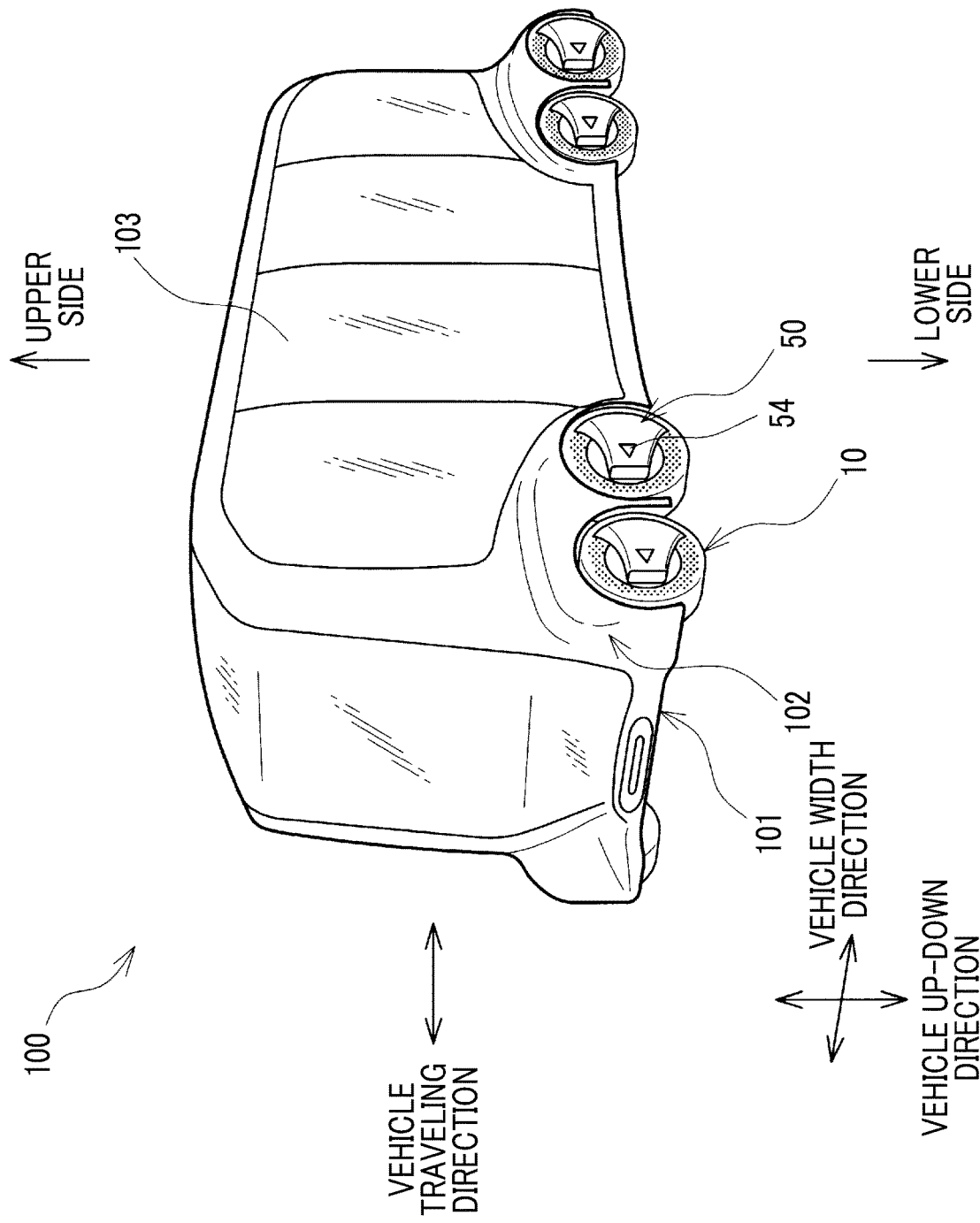
FIG. 1 is a perspective view of an electric vehicle in which a drive unit for a vehicle including a wheel cover of an embodiment is mounted.

Hereinafter, a drive unit 10 for a vehicle including a wheel cover 50 of an embodiment will be described referring to the drawings. First, an electric vehicle 100 as a vehicle in which the drive unit 10 for a vehicle is mounted will be described referring to FIG. 1.

Figure 2:
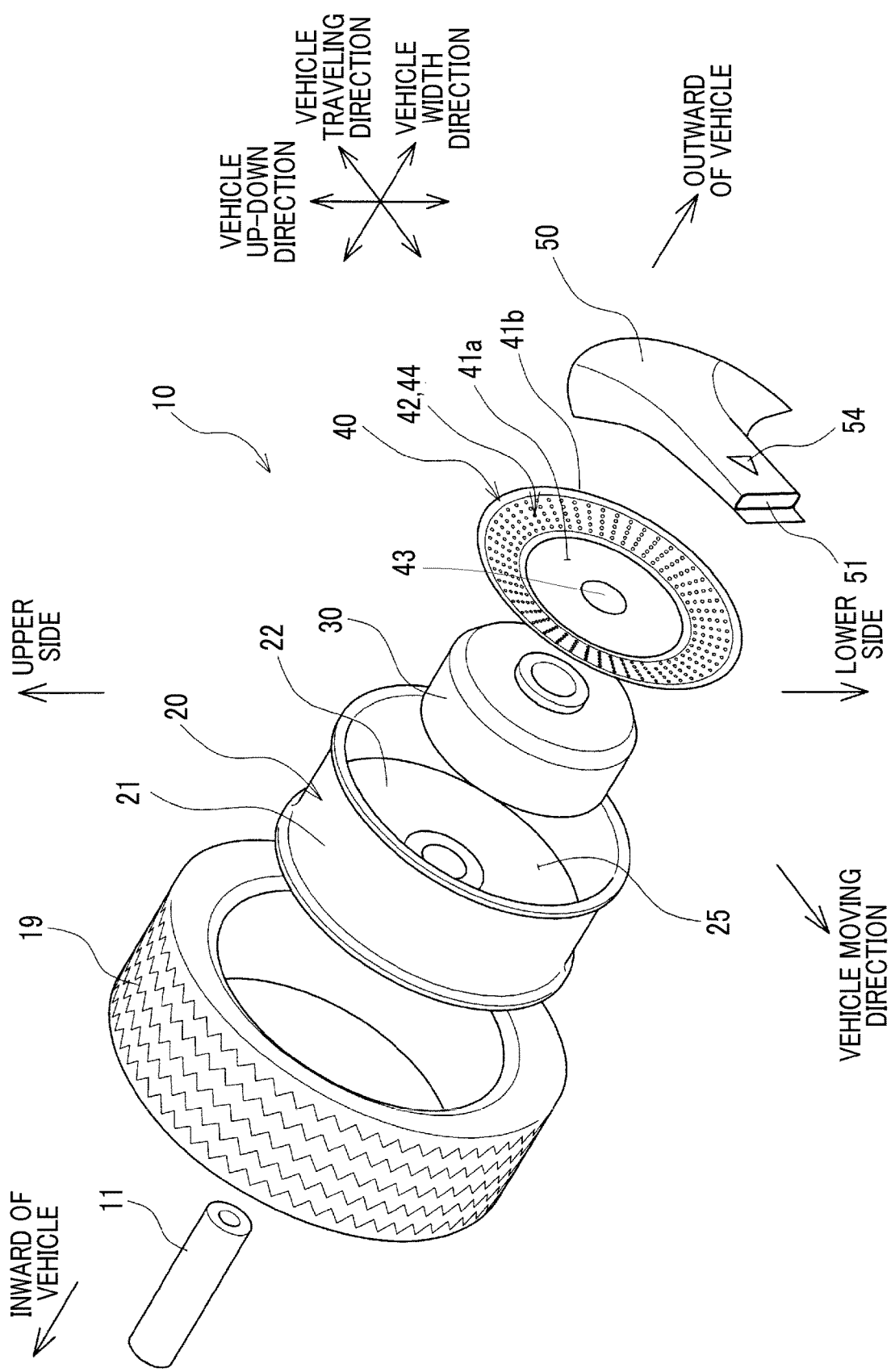
FIG. 2 is an exploded perspective view of the drive unit for a vehicle including the wheel cover of the embodiment.

As shown in FIG. 1, the electric vehicle 100 is an eight-wheel drive vehicle in which two drive units 10 for a vehicle each incorporated with an in-wheel motor 30 shown in FIG. 2 are disposed in parallel in a moving direction in each of protruding portions 102 at four corners of a vehicle body 101 and a floor of a vehicle cabin is made fully flat. A wheel cover 50 is attached outward of each drive unit 10 for a vehicle in a vehicle width direction. A shape of the vehicle body 101 is made front-rear symmetric, and an appearance design of the vehicle body 101 is also made front-rear symmetric. The electric vehicle 100 travels in an autonomous driving mode and can travel in any direction of front and rear directions. A sliding door 103 is provided in a side surface of the vehicle body 101. The electric vehicle 100 has, for example, a size as large as a minibus, and is used as a transport vehicle for a passenger or a cargo, or a moving store or a moving office with the inside of the vehicle as a store or an office.

As shown in FIG. 2, the drive unit 10 for a vehicle includes a wheel 20 of a bottomed cylindrical shape (a shape of a cylinder having a bottom in the vehicle width direction) having a tire 19 attached to an outer periphery of the wheel 20, the in-wheel motor 30 disposed in an internal space 25 of the wheel 20, an annular motor cover 40, and a wheel cover 50. The wheel 20 is present around a shaft 11 non-rotatably attached to the vehicle body 101 and is rotatable. The in-wheel motor 30 and the motor cover 40 are fixed to the shaft 11. The wheel cover 50 is present around the shaft 11 and is turned by an actuator fixed to the shaft. A detailed structure will be described below.

Figure 3:
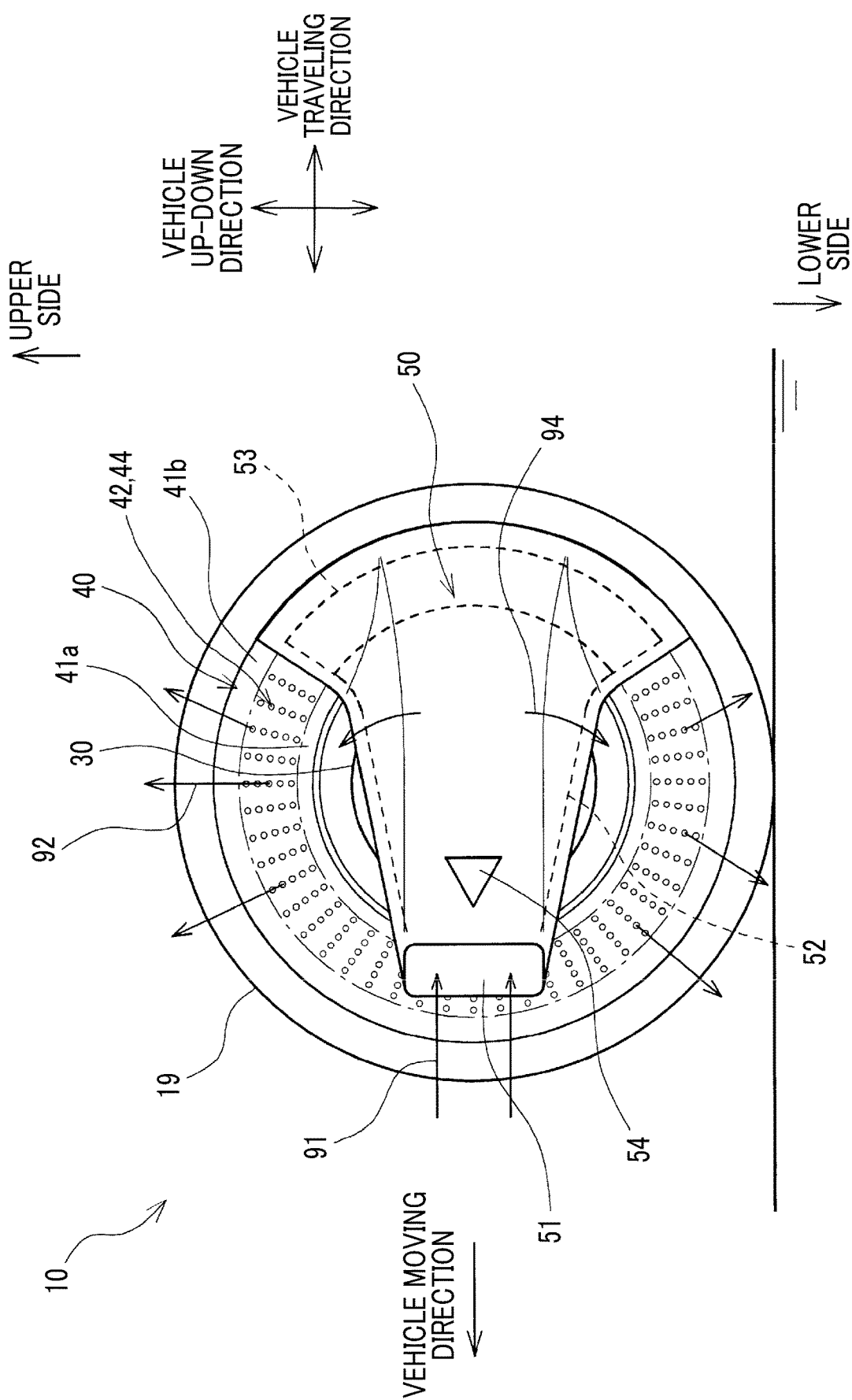
FIG. 3 is a side view of the drive unit for a vehicle including the wheel cover of the embodiment.

As shown in FIG. 3, the wheel cover 50 has an intake port 51 that takes cooling air cooling the in-wheel motor 30, and the motor cover 40 has an exhaust port 42 that discharges air after cooling the in-wheel motor 30 to the atmosphere. The wheel cover 50 has a triangular mark 54 indicating a moving direction of the electric vehicle 100 on a front surface outward in the vehicle width direction. As indicated by an arrow 94 of FIG. 3, the wheel cover 50 is turnable such that the intake port 51 is positioned in the moving direction of the vehicle.

Figure 4:
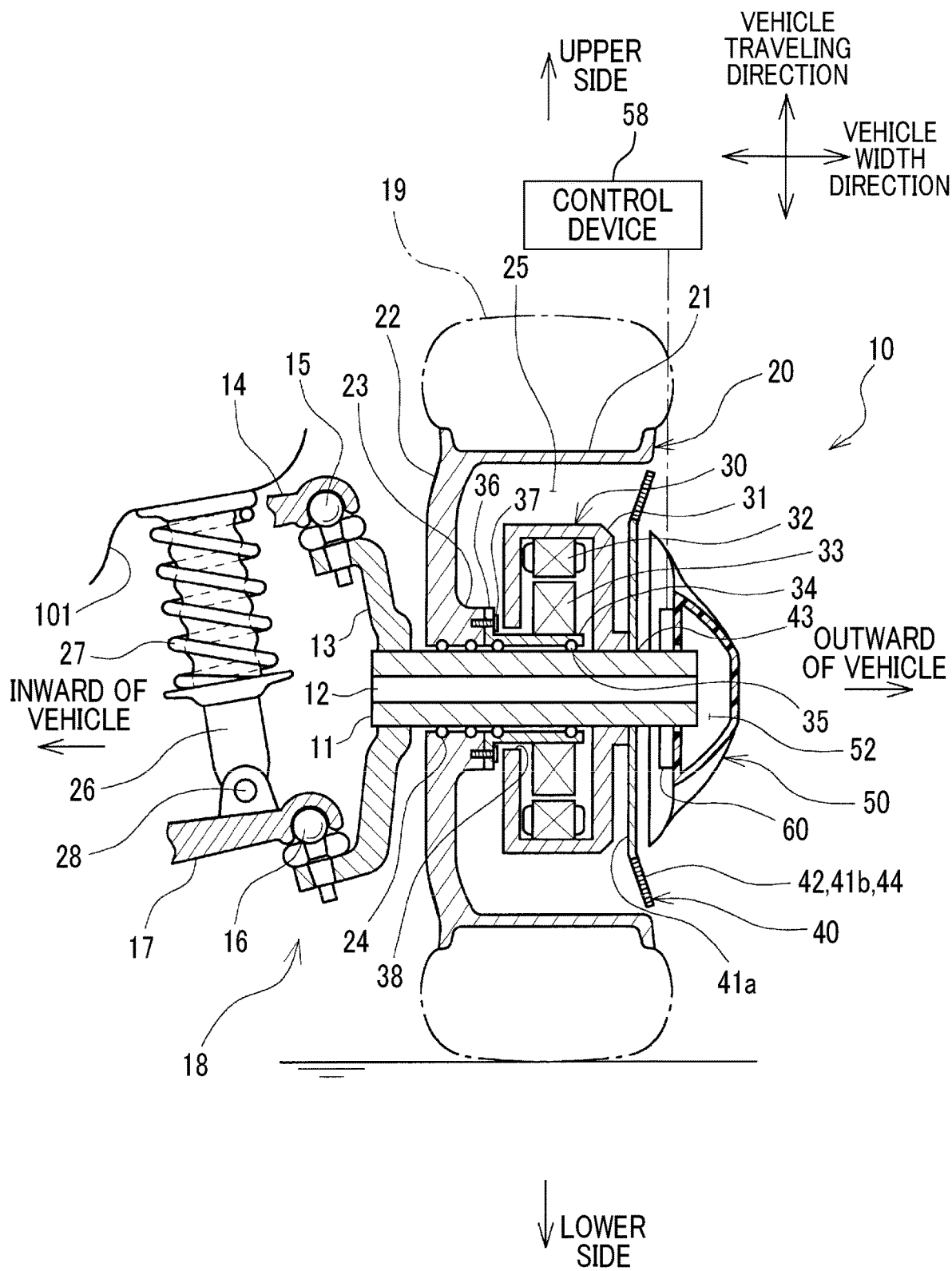
FIG. 4 is a sectional elevational view of the drive unit for a vehicle including the wheel cover of the embodiment.

As shown in FIG. 4, the shaft 11 is attached non-rotatably to the vehicle body 101 by a suspension mechanism 18. While there are various configurations of the suspension mechanism 18, as an example, as shown in FIG. 4, the suspension mechanism 18 is constituted of a knuckle arm 13 to which the shaft 11 is fixed, an upper arm 14 that is attached to an upper side of the knuckle arm 13 through an upper pivot 15, a lower arm 17 that is attached to a lower side of the knuckle arm 13 through a lower pivot 16, a shock absorber 26 that is rotatably connected to the lower arm 17 with a pin 28, and a coil spring 27 attached between the shock absorber 26 and the vehicle body 101. In the above-described case, the upper arm 14 and the lower arm 17 are turnably attached to the vehicle body 101.

The wheel 20 has a bottomed cylindrical shape including a cylindrical rim 21 having the tire 19 attached to an outer surface, and a disc 22 in contact with a vehicle inner end as one end portion of the rim 21 in an axial direction. The disc 22 has a hub 23 at the center. Ball bearings 24 are attached between an inner periphery of the hub 23 and an outer periphery of the shaft 11. The wheel 20 is attached to be rotatable around the shaft 11 by the ball bearings 24. The in-wheel motor 30 is present in the internal space 25 outward of the disc 22 of the wheel 20 in the vehicle width direction.

The in-wheel motor 30 includes a casing 31, a stator 32, a rotor 33, and an output shaft 34. An outward end of the casing 31 in the vehicle width direction is non-rotatably fixed to the outer periphery of the shaft 11. The stator 32 is fixed to an inner surface of the casing 31. Inward of the casing 31 in the vehicle width direction, a hole 38 through which the output shaft 34 passes is provided. Ball bearings 35 are attached between an inner periphery of the output shaft 34 and an outer periphery of the shaft 11. The output shaft 34 is rotatable around the shaft 11 by the ball bearings 35. Inward of the output shaft 34 in the vehicle width direction, a flange 36 that faces the hub 23 of the wheel 20 is provided. The flange 36 is fastened to the hub 23 of the wheel 20 by bolts 37. At a position facing the stator 32 of the output shaft 34, the rotor 33 is fixed at a gap from the stator 32 in a radial direction.

As described above, the casing 31 and the stator 32 of the in-wheel motor 30 are non-rotatably fixed to the shaft 11, and the output shaft 34 and the rotor 33 are attached to be rotatable around the shaft 11. The shaft 11 is provided with a center hole 12, and electric power supply to the in-wheel motor 30 is performed from the center hole 12 of the shaft 11 by a feed cable (not shown) routed in the casing 31.

As shown in FIG. 2, the motor cover 40 has a flat plate portion 41a provided with a center hole 43, and a rising portion 41b positioned outward of the flat plate portion 41a and outward of the vehicle. As shown in FIG. 3, the rising portion 41b is provided with multiple small circular holes 44. The multiple circular holes 44 constitute the exhaust port 42 that discharges air after cooling the in-wheel motor 30 to the atmosphere. As shown in FIG. 4, the motor cover 40 is fixed such that the center hole 43 is fitted into an outer periphery of the shaft 11. Accordingly, the motor cover 40 is not rotated with respect to the shaft 11.

Figure 5:
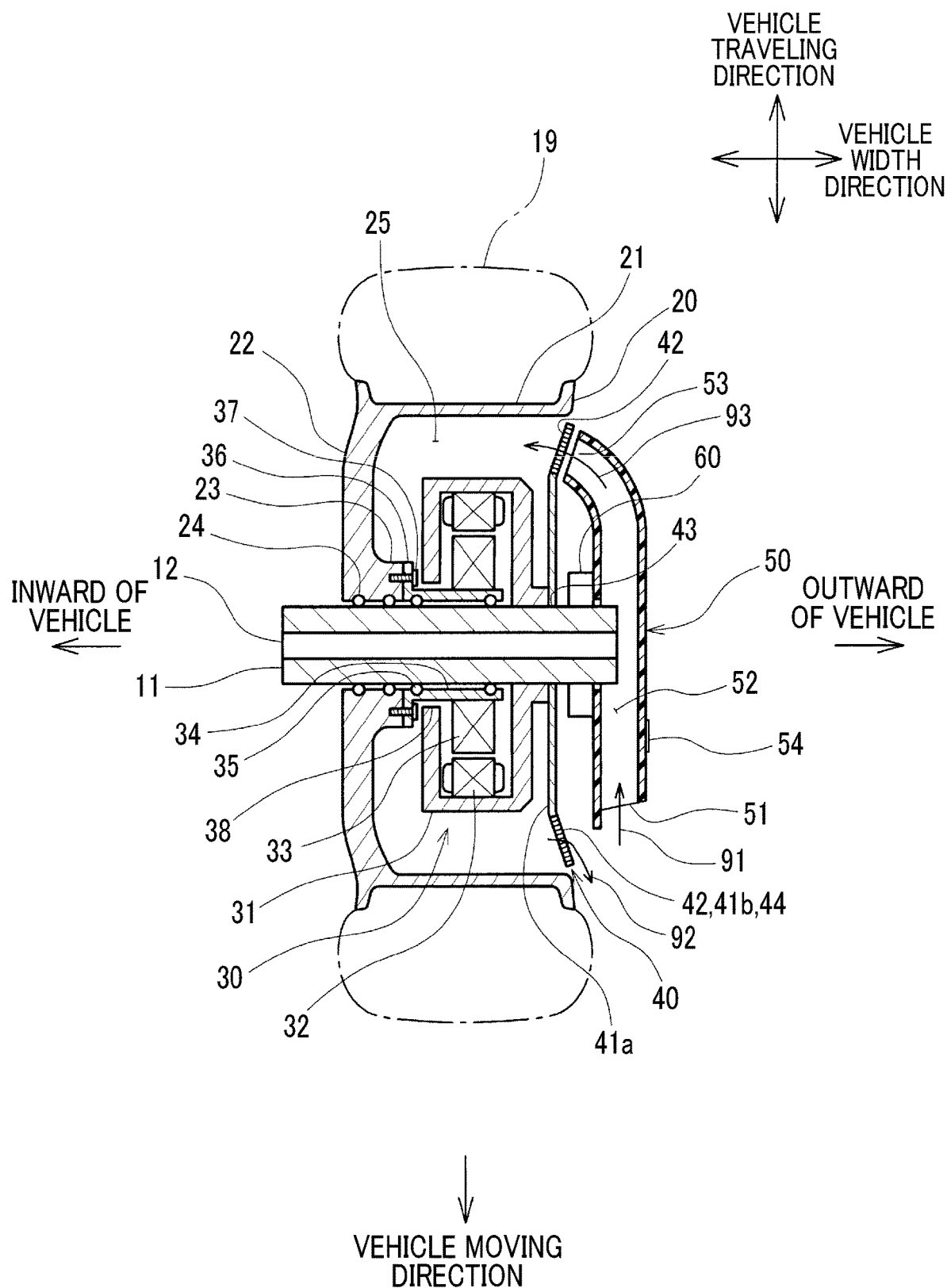
FIG. 5 is a sectional plan view of the drive unit for a vehicle including the wheel cover of the embodiment.

As shown in FIGS. 4 and 5, an actuator 60 that turns and drives the wheel cover 50 around the shaft 11 is fixed outward of the motor cover 40 in the vehicle width direction. The inside of the wheel cover 50 in the vehicle width direction is attached to be turnable around the shaft 11 and is connected to a drive part of an actuator 60. The actuator 60 is connected to a control device 58 and operates in response to a command of the control device 58. In FIG. 5, the suspension mechanism 18 is omitted.

As described above, the wheel 20 is present around the shaft 11 non-rotatably attached to the vehicle body 101 and is rotatable, the in-wheel motor 30 is non-rotatably fixed to the shaft 11 to rotationally drive the wheel 20, and the wheel cover 50 is present around the shaft 11 and is turned by the actuator 60 fixed to the shaft 11. With this, the wheel cover 50 is supported to be relatively rotatable with the rotation of the wheel 20.

As shown in FIGS. 2 and 3, the wheel cover 50 is a trapezoidal duct member that is expanded and extended from a tip side provided with the square intake port 51 toward an arc-shaped root side along an outer periphery of the rising portion 41b of the motor cover 40. As described above, there is a triangular mark 54 indicating the moving direction of the electric vehicle 100 on a front surface outward in the vehicle width direction. As shown in FIG. 5, the intake port 51 communicates with an internal intake air flow passage 52. The intake air flow passage 52 is bent inward in the vehicle width direction toward the rising portion 41b of the motor cover 40 when approaching the root side. Then, as shown in FIGS. 2 and 3, the root side becomes an arc-shaped intake outlet 53 facing the exhaust port 42 of the motor cover 40.

When the electric vehicle 100 mounted with the drive unit 10 for a vehicle configured as above travels, the control device 58 drives the actuator 60 to turn the wheel cover 50 and positions the intake port 51 of the wheel cover 50 in the moving direction. The wheel cover 50 has such a shape that the width on the tip side with the intake port 51 is narrow and the width is expanded toward the root side. In the shape, the narrow tip is recognized as indicating the moving direction of the electric vehicle 100. Accordingly, the wheel cover 50 has a shape indicating the moving direction of the electric vehicle 100. Similarly, since the triangular mark 54 in the wheel cover 50 has a tip toward a side facing the intake port 51, the mark 54 is a figure indicating the moving direction of the electric vehicle 100. For this reason, as shown in FIG. 1, when the intake port 51 is directed to the moving direction of the electric vehicle 100, the tip of the mark 54 also becomes the moving direction of the electric vehicle 100, and a person who is outside the electric vehicle 100 can determine the moving direction of the electric vehicle 100 with the shape of the wheel cover 50 or the mark 54. The wheel cover 50 that is disposed on a side surface of the electric vehicle 100 is a highly noticeable portion and is a portion easy to attract eyes of a person who is outside the vehicle. For this reason, the moving direction is displayed with the shape of the wheel cover 50 or the mark 54, whereby it is possible to allow a person who is outside the vehicle to more easily determine the moving direction of the electric vehicle 100. In the electric vehicle 100 having a front-rear symmetry, since the shape of the wheel cover 50 having a front-rear asymmetry is easy to attract eyes, it is possible to allow a person who is outside the vehicle to easily determine the moving direction of the electric vehicle 100. In addition, even when a photograph during traveling of the electric vehicle 100 is taken, it is possible to determine the moving direction of the electric vehicle 100 with the direction of the wheel cover 50 and the direction of the mark 54.

When the electric vehicle 100 changes the moving direction to an opposite direction, the control device 58 drives the actuator 60 to reverse the wheel cover 50 and directs the intake port 51 of the wheel cover 50 to the moving direction.

As indicated by arrows 91 of FIGS. 3 and 5, when the electric vehicle 100 travels, cooling air is introduced from the intake port 51 on the tip side into the intake air flow passage 52. As indicated by an arrow 93 of FIG. 5, cooling air introduced into the intake air flow passage 52 is guided to the intake outlet 53 and is introduced from the exhaust port 42 of the motor cover 40 facing the intake outlet 53 into the internal space 25 of the wheel 20. As indicated by arrows 92 shown in FIGS. 3 and 5, air that flows in the internal space 25 and cools the in-wheel motor 30 is discharged from the exhaust port 42 of the motor cover 40 not facing the intake outlet 53 of the wheel cover 50 to the atmosphere.

As described above, the drive unit 10 for a vehicle of the embodiment introduces cooling air from the intake port 51 of the wheel cover 50 into the internal space 25 of the wheel 20, and air that cools the in-wheel motor 30 is discharged from the exhaust port 42 of the motor cover 40 to the atmosphere as indicated by the arrows 92 shown in FIGS. 3 and 5. For this reason, even though the in-wheel motor 30 is present in the internal space 25 of the wheel 20, it is possible to effectively cool the in-wheel motor 30. Since the in-wheel motor 30 is allowed to be present in the internal space 25 of the wheel 20, it is possible to reduce the size of the drive unit 10 for a vehicle, and to expand the inside of the vehicle cabin of the electric vehicle 100. In addition, unlike the drive unit for a vehicle of the related art, since the in-wheel motor 30 does not protrude toward the vehicle body 101 of the wheel 20, it is possible to expand the inside of the vehicle cabin of the electric vehicle 100 in which the floor of the vehicle cabin is made fully flat.

A fan or the like for introducing cooling air into the internal space 25 of the wheel 20 may be provided to more effectively cool the in-wheel motor 30.

While the electric vehicle 100 is stopped, the intake port 51 of the wheel cover 50 may be directed downward. When the electric vehicle 100 travels in an autonomous driving mode, while the electric vehicle 100 is stopped, the intake port 51 of the wheel cover 50 may be directed to a traveling direction after the stop. A liquid crystal display panel may be attached outward of the wheel cover 50 in the vehicle width direction instead of the mark 54, and may be made, for example, to display a triangle that is positioned in the moving direction or to make the triangular mark 54 blink and move toward the moving direction. With this, it is possible to allow a person who is outside the electric vehicle 100 to more easily determine the moving direction of the electric vehicle 100.

A drive unit 80 for a vehicle including a wheel cover 70 of another embodiment will be described referring to FIGS. 6 and 7. The same portions as those in the embodiment described above referring to FIGS. 1 to 5 are represented by the same reference numerals, and description will not be repeated. In FIG. 7, the suspension mechanism 18 is omitted.

The drive unit 80 for a vehicle of the embodiment has louvers 74 configured to be able to change directions of openings 76 with the actuator 60 in the wheel cover 70. The wheel cover 70 and the actuator 60 are fixed to a shaft 11 shown in FIG. 7, and are not turned around the shaft 11 unlike the wheel cover 50 in the embodiment described above.

Figure 6:
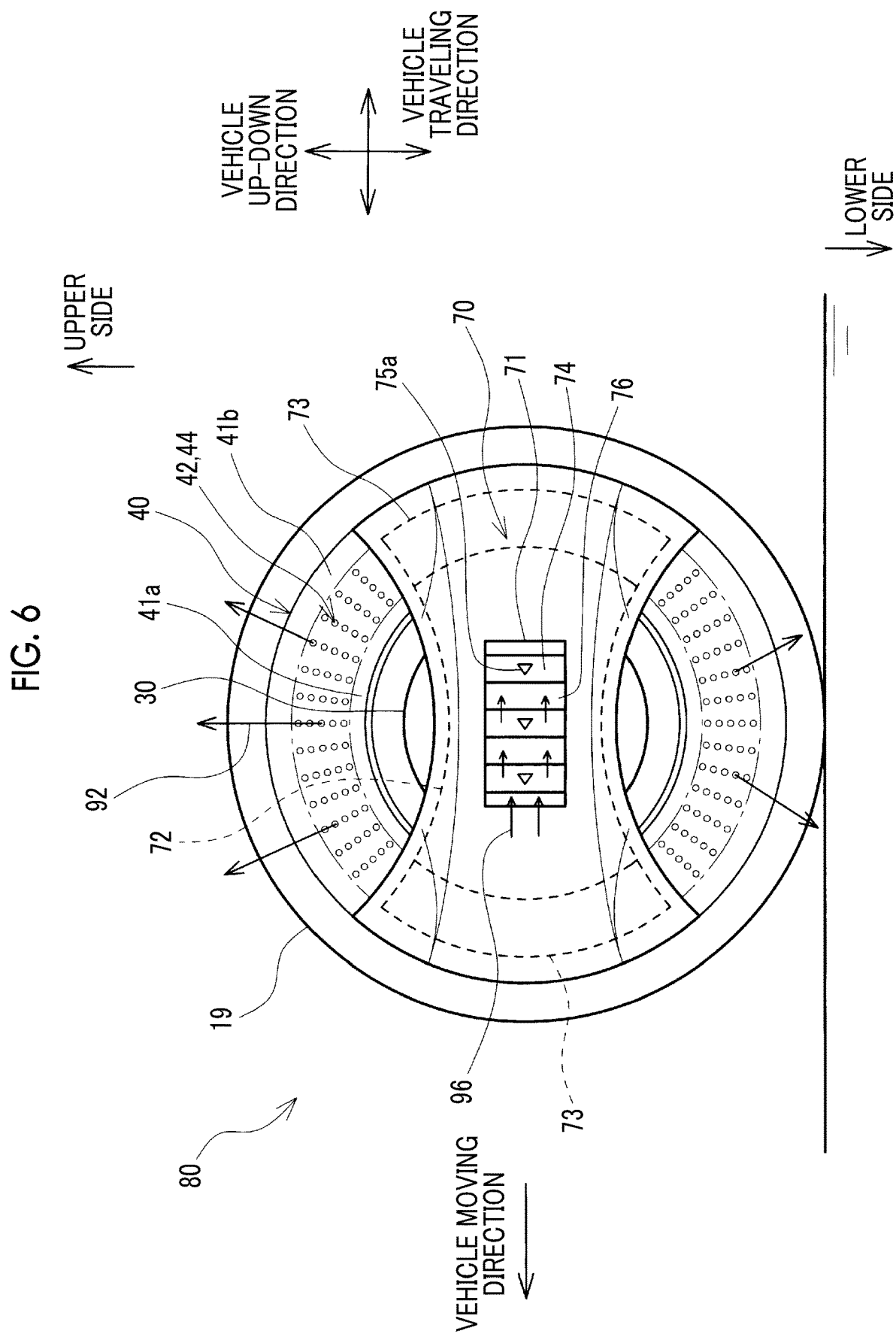
FIG. 6 is a side view of a drive unit for a vehicle including a wheel cover of another embodiment.
Figure 7:
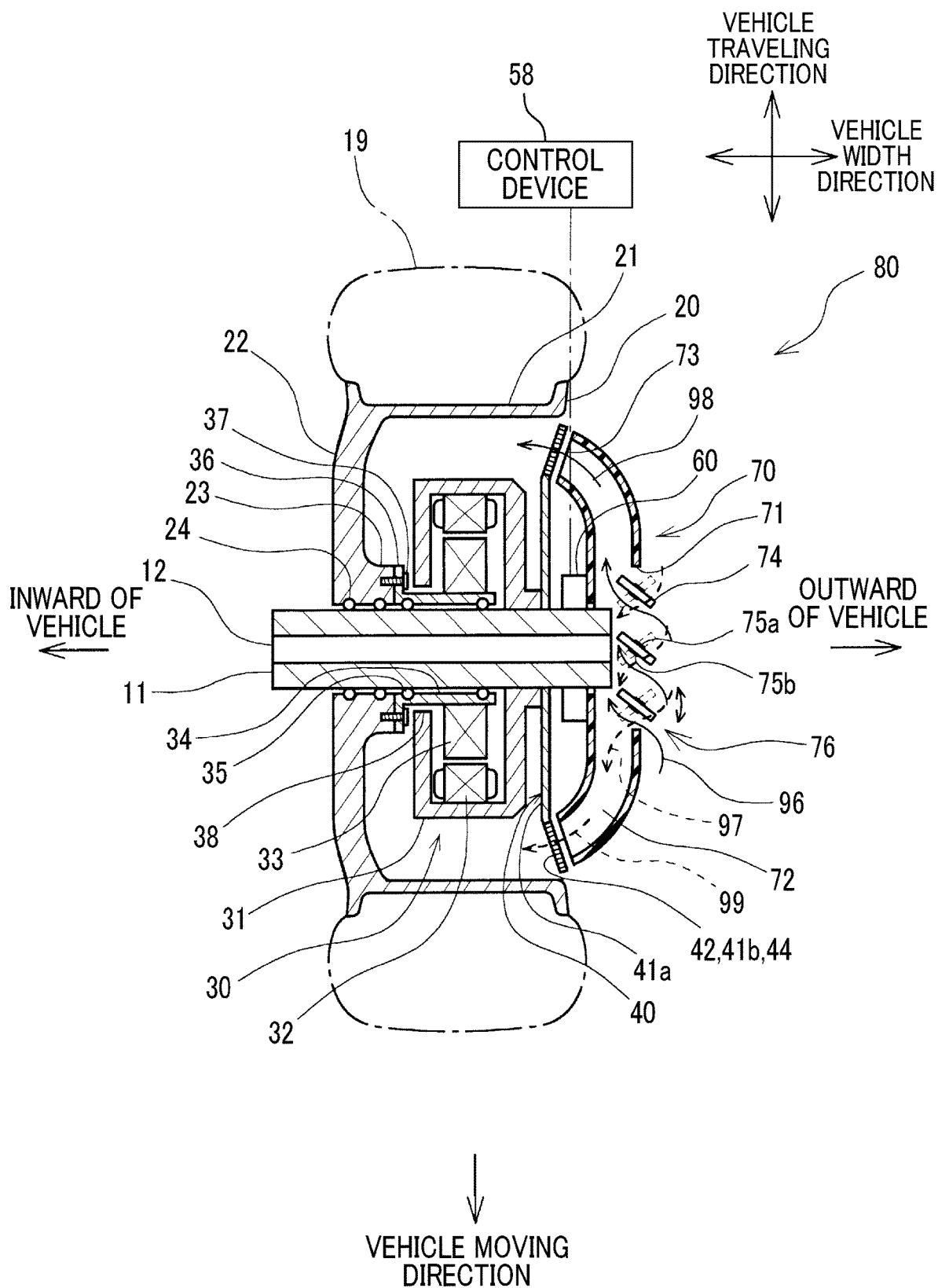
FIG. 7 is a sectional plan view of the drive unit for a vehicle including the wheel cover of another embodiment shown in FIG. 6.

As shown in FIG. 6, the wheel cover 70 is a duct member having a shape in which a central portion is necked and both side portions are expanded when viewed from a side surface, and as shown in FIG. 7, an intake air flow passage 72 that communicates with a quadrangular hole 71 in the central portion and is extended from the central portion toward both side portions is provided inward of the wheel cover 70. The intake air flow passage 72 is bent inward in the vehicle width direction toward the rising portion 41b of the motor cover 40 when approaching both side portions. Then, as shown in FIGS. 6 and 7, both side portions become an arc-shaped intake outlet 73 facing the exhaust port 42 of the motor cover 40.

Three louvers 74 are attached to the quadrangular hole 71 provided in the central portion. The louvers 74 are driven by the actuator 60 shown in FIG. 7, and the directions of the openings 76 can be changed between positions where the openings 76 are inclined in the vehicle moving direction and the directions of the openings 76 become the vehicle moving direction as indicated by solid lines in FIG. 7 and positions where the openings 76 are inclined in an opposite direction to the vehicle moving direction and the directions of the openings 76 become a reverse direction to the vehicle moving direction as indicated by broken lines in FIG. 7. Triangular marks 75a, 75b indicating the moving direction of the electric vehicle 100 are attached to the front surfaces and the rear surfaces of the three louvers 74. As indicated by the solid lines in FIG. 7, when the louvers 74 are inclined in the vehicle moving direction, the triangular marks 75a on the front surfaces appear on the outer surfaces. As indicated by the broken lines in FIG. 7, when the louvers 74 are inclined in the opposite direction to the vehicle moving direction, the triangular marks 75b on the rear surfaces appear on the outer surfaces. When the marks 75a on the front surfaces appear, the tips of the triangles of the marks 75a indicate the vehicle moving direction shown in FIG. 7, and when the marks 75b on the rear surfaces appear, the tips of the triangles indicate the opposite direction to the vehicle moving direction shown in FIG. 7.

As described above, in the drive unit 80 for a vehicle of the embodiment, the wheel 20 is present around the shaft 11 non-rotatably attached to the vehicle body 101 and is rotatable, the in-wheel motor 30 is fixed non-rotatably to the shaft 11 to rotationally drive the wheel 20, the wheel cover 70 and the actuator 60 are fixed to the shaft 11, and the louvers 74 are configured such that the directions of the openings 76 are changed by the actuator 60. The actuator 60 is connected to the control device 58 and operates in response to a command of the control device 58.

With this, the wheel cover 70 is non-rotatably supported even though the wheel 20 is rotated, and the opening directions of the louvers 74 can be retained in a state of displaying the marks 75a, 75b indicating the moving direction of the electric vehicle 100. For this reason, the opening directions of the louvers 74 are changed, whereby it is possible to display the moving direction of the electric vehicle 100 with the marks 75a, 75b of the louvers 74.

When the electric vehicle 100 mounted with the drive unit 80 for a vehicle configured as above travels, the control device 58 drives the actuator 60 and drives the louvers 74 of the wheel cover 70 to direct the directions of the openings 76 to the vehicle moving direction shown in FIG. 6. With this, the marks 75a on the front surfaces, the tips of which are directed to the vehicle moving direction, appear and indicate the moving direction of the electric vehicle 100.

Like the wheel cover 50 of the embodiment described above, the wheel cover 70 that is disposed on the side surface of the electric vehicle 100 is a highly noticeable portion and is a portion easy to attract eyes of a person who is outside the vehicle. For this reason, the moving direction is displayed with the marks 75a, 75b of the louvers 74 of the wheel cover 70, whereby it is possible to allow a person who is outside the vehicle to more easily determine the moving direction of the vehicle.

When the electric vehicle 100 travels, as indicated by arrows 96 of FIGS. 6 and 7, cooling air is introduced from the openings 76 inclined in the vehicle moving direction into the intake air flow passage 72. As indicated by an arrow 98 of FIG. 7, cooling air introduced into the intake air flow passage 72 is guided to the intake outlet 73 and is introduced from the exhaust port 42 of the motor cover 40 facing the intake outlet 73 into the internal space 25 of the wheel 20. As indicated by arrows 92 shown in FIG. 6, air that flows in the internal space 25 and cools the in-wheel motor 30 is discharged from the exhaust port 42 of the motor cover 40 not facing the intake outlet 73 of the wheel cover 70 to the atmosphere.

When the electric vehicle 100 travels in the opposite direction to the vehicle moving direction shown in FIGS. 6 and 7, the louvers 74 are inclined such that the directions of the openings 76 become the opposite direction to the vehicle moving direction shown in FIGS. 6 and 7. With this, the marks 75b on the rear surfaces, the tips of which are directed to the opposite direction to the vehicle moving direction, appear and indicate the moving direction of the electric vehicle 100. As indicated by an arrow 97 of a broken line in FIG. 7, air enters the intake air flow passage 72 from the openings 76, flows in the intake air flow passage 72 in the opposite direction to the vehicle moving direction, and is introduced into the internal space 25 of the wheel 20 as indicated by an arrow 99. Then, air is discharged from the exhaust port 42 to the atmosphere as indicated by the arrows 92 shown in FIG. 6.

The drive unit 80 for a vehicle of the embodiment described above can perform the introduction of cooling air with a simple configuration in which the inclination directions of the louvers 74 are changed, and the display of the moving direction, in addition to the same effects as in the drive unit 10 for a vehicle described above.

In the respective embodiments described above, although the wheel covers 50, 70 that are attached to the drive units 10, 80 for a vehicle using the in-wheel motor 30 have been described, a wheel cover 150 that is attached to a general vehicle 200 having an engine, a motor, or the like stored in a vehicle body 201 will be described referring to FIGS. 8 and 9. The same portions as those in the embodiments described referring to FIGS. 1 to 5 are represented by the same reference numerals, and description will not be repeated.

Figure 8:
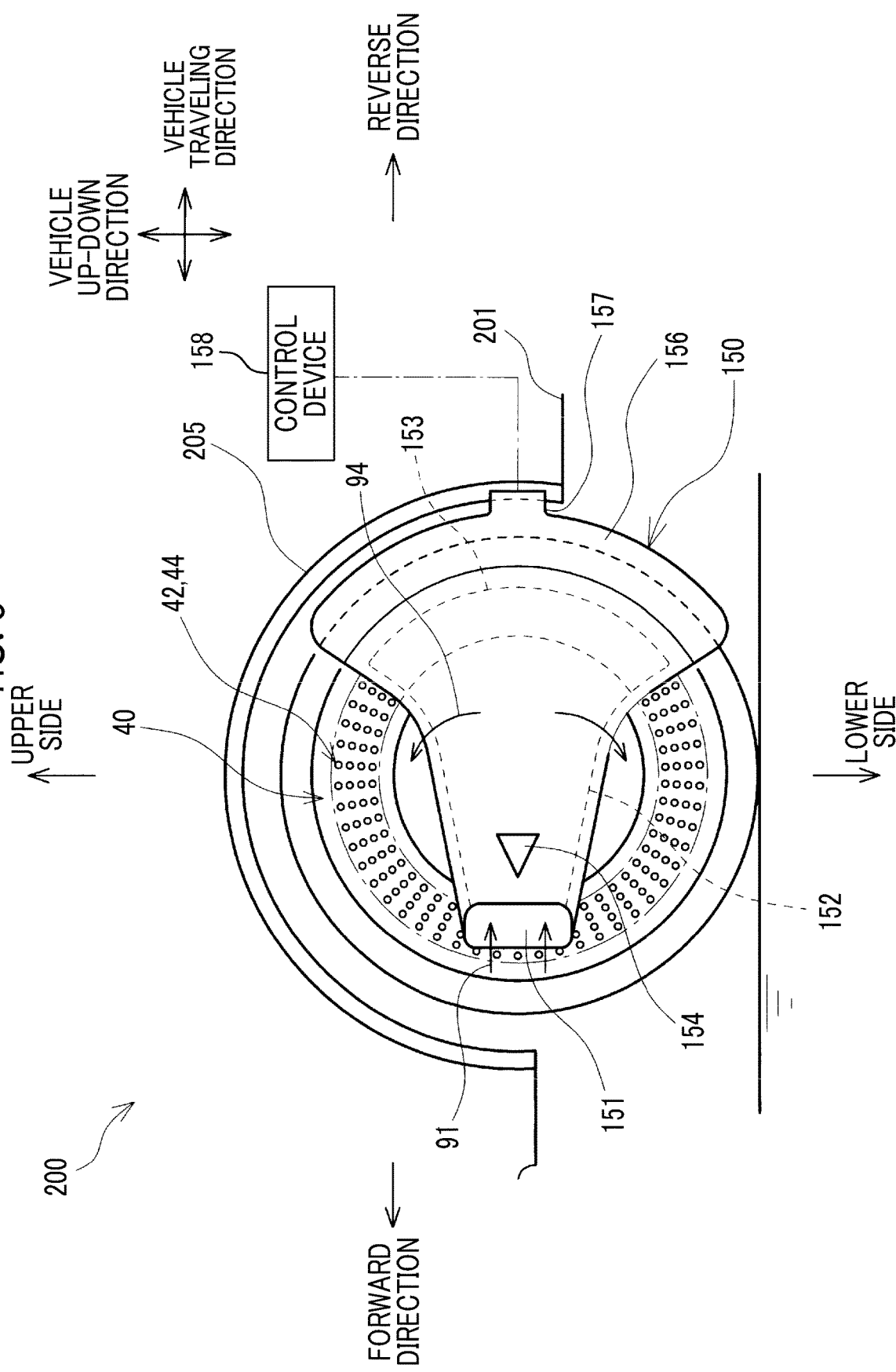
FIG. 8 is a side view of a vicinity of a tire-wheel assembly of a vehicle attached with a wheel cover of still another embodiment.
Figure 9:
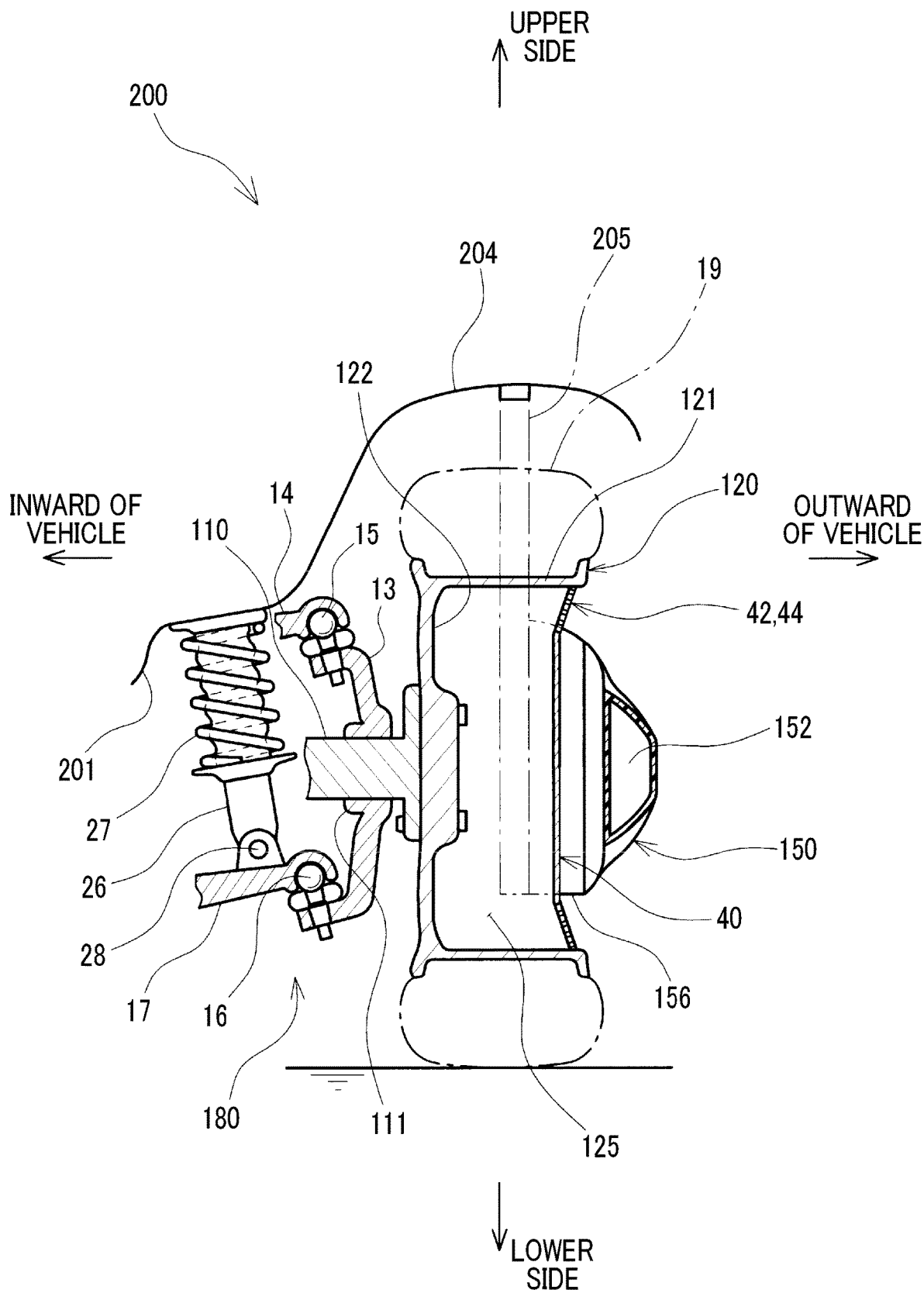
FIG. 9 is a sectional elevational view of the vicinity of the tire-wheel assembly of the vehicle attached with the wheel cover of still another embodiment shown in FIG. 8.

As shown in FIGS. 8 and 9, the wheel cover 150 of the embodiment is a trapezoidal duct member that is expanded and extended from a tip side with a square intake port 151 toward an arc-shaped root side. Like the wheel cover 50 described above, as shown in FIG. 9, an intake port 151 communicates with an internal intake air flow passage 152, and the root side of the intake air flow passage 152 becomes an arc-shaped intake outlet 153 facing the exhaust port 42 of the motor cover 40. On the front surface outward in the vehicle width direction, there is a triangular mark 154 indicating the moving direction of the vehicle 200.

On the root side of the wheel cover 150, an arm 156 that is extended outward of the wheel 120 is provided. A linear motor 157 that is guided by a guide rail 205 attached to an inner peripheral surface of a wheel house 204 of the vehicle body 201 and moves in a peripheral direction is attached to a tip of the arm 156. The linear motor 157 turns the wheel cover 150 along the guide rail 205. The linear motor 157 is connected to the control device 158 and operates in response to a command of the control device 158.

As shown in FIG. 9, the wheel 120 that is constituted of a rim 121 and a disc 122 is fastened to a drive shaft 110 supported to be rotatable with respect to the vehicle body 201 by a suspension mechanism 180 with bolts. The suspension mechanism 180 may be constituted of a hub 111 that rotatably retains the drive shaft 110, a knuckle arm 13 that is attached to the hub 111, an upper arm 14 that is attached to an upper side of the knuckle arm 13 through an upper pivot 15, a lower arm 17 that is attached to a lower side of the knuckle arm 13 through a lower pivot 16, a shock absorber 26 that is rotatably connected to the lower arm 17 with a pin 28, and a coil spring 27 that is attached between the shock absorber 26 and the vehicle body 201.

As described above, the wheel 120 is rotated with the drive shaft 110 rotatably attached to the vehicle body 201, and the wheel cover 150 is guided by the guide rail 205 fixed to the wheel house 204 of the vehicle body 201 and moves in a peripheral direction amount the drive shaft 110 by the linear motor 157. As described above, the wheel cover 150 is supported by the vehicle body 201 to be relatively rotatable with the rotation of the wheel 120.

When the vehicle 200 configured as above travels forward, the control device 158 drives the actuator 60 to turn the wheel cover 150 as indicated by an arrow 94 of FIG. 8, and directs the intake port 151 of the wheel cover 150 to the forward direction as shown in FIG. 8. When the vehicle 200 travels in reverse, the control device 158 drives the actuator 60 to reverse the wheel cover 150 and directs the intake port 151 of the wheel cover 150 to the reverse direction.

As described above, in the vehicle 200, the shape of the wheel cover 150 or the mark 154 outward in the vehicle width direction can be retained in a state of being rotated so as to indicate the moving direction of the vehicle 200 regardless of the rotation of the wheel 120. For this reason, it is possible to display the moving direction of the vehicle 200 with the shape of the wheel cover 150 or the mark 154, and to allow a person who is outside the vehicle 200 to easily determine the moving direction of the vehicle 200.

When the vehicle 200 travels, as indicated by arrows 91 of FIG. 8, cooling air is introduced from the intake port 151 on the tip side into the intake air flow passage 152, flows from the intake outlet 153 into an internal space 125 of the wheel 120 as a space inward of the tire 19, and can cool a brake pad (not shown) or the like disposed in the internal space 125.

As described above, according to the wheel cover 150 of the embodiment, it is possible to display the moving direction of the vehicle 200 with the shape of the wheel cover 150 or the mark 154, to allow a person who is outside the vehicle 200 to easily determine the moving direction of the vehicle 200, and to cool equipment disposed in the internal space 125 during traveling of the vehicle 200.

In the vehicle 200, the control device 158 may turn the wheel cover 150 in conjunction with a shift lever. For example, when the shift lever is in a D range, the intake port 151 of the wheel cover 150 may be directed to the forward direction, when the shift lever is in an R range, the intake port 151 of the wheel cover 150 may be directed to the reverse direction, and when the shift lever is in a P range, the intake port 151 of the wheel cover 150 may be directed downward.

A wheel cover 270 of still another embodiment will be described referring to FIGS. 10 and 11. The wheel cover 270 includes liquid crystal panels 77 as display units that display images 78 indicating the moving direction of the electric vehicle 100 on a surface outward in the vehicle width direction instead of the marks 75a, 75b provided in the louvers 74 of the wheel cover 70 incorporated in the drive unit 80 for a vehicle described above referring to FIGS. 6 and 7. The liquid crystal panels 77 are connected to a control device 258, and display the images 78 in response to a command of the control device 258. Like the wheel cover 70 described above, since the wheel cover 270 of the embodiment is fixed to the shaft 11, the liquid crystal panels 77 are retained, for example, in a horizontal direction shown in FIG. 10 regardless of the rotation of the wheel 20. Since other structures are the same as those of the wheel cover 70, the same parts are represented by the same reference numerals, and description will not be repeated.

Figure 10:
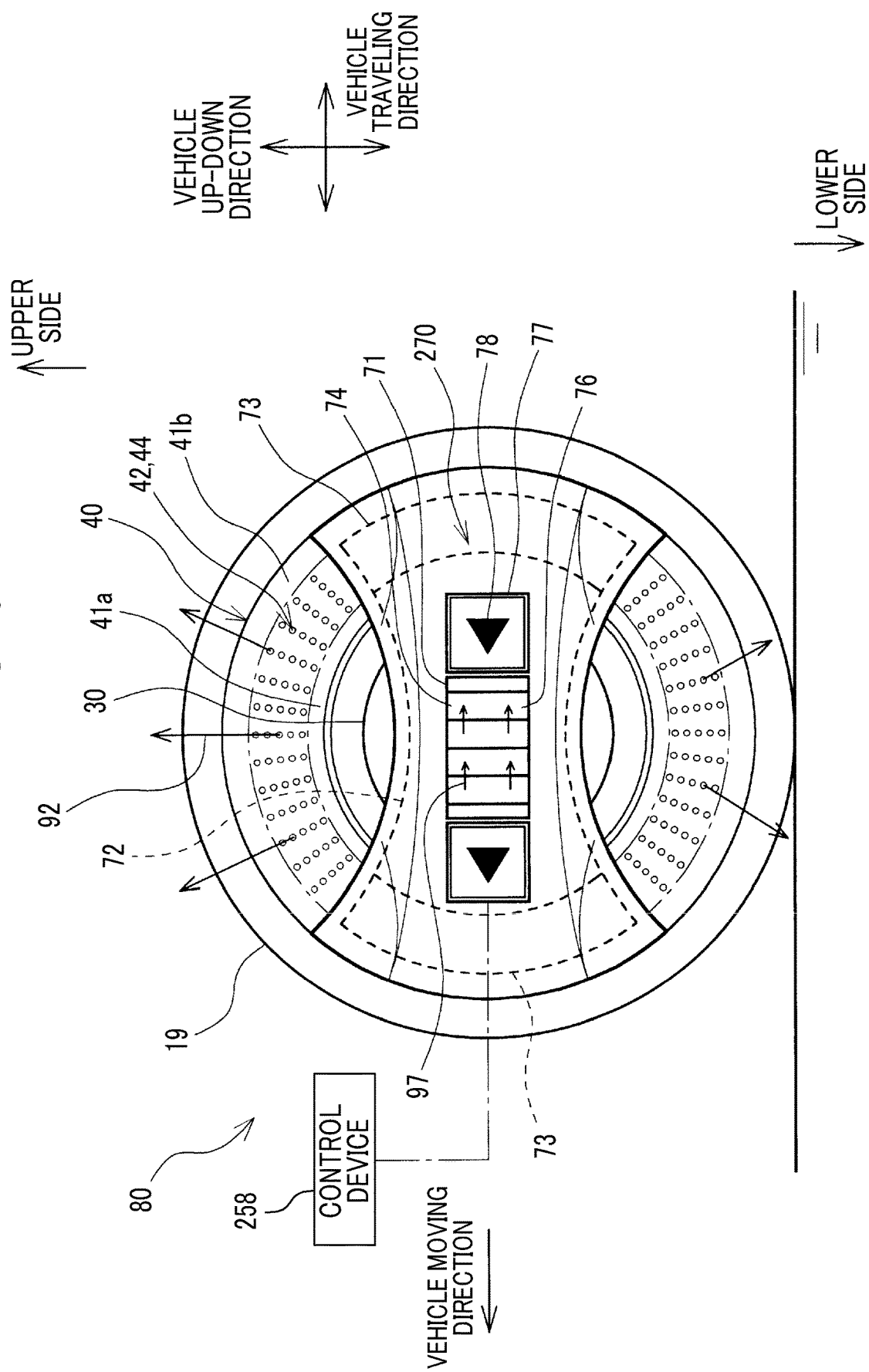
FIG. 10 is a side view of a drive unit for a vehicle including a wheel cover of still another embodiment.

As shown in FIG. 10, the control device 258 displays the triangular images 78 indicating the moving direction of the electric vehicle 100 on the liquid crystal panels 77. When the electric vehicle 100 travels in a direction opposite to the state shown in FIG. 10, the control device 258 reverses the directions of the triangular images 78. The images 78 that are displayed on the liquid crystal panels 77 are not limited to the triangles and may be, for example, arrows, and the triangular images 78 may be blinked and moved in the moving direction.

As described above, in the wheel cover 270, since the liquid crystal panels 77 can be retained in a predetermined direction regardless of the rotation of the wheel 20, the images 78 indicating the moving direction of the electric vehicle 100 are displayed on the liquid crystal panels 77, whereby it is possible to display the moving direction of the electric vehicle 100. The wheel cover 270 that is disposed on the side surface of the electric vehicle 100 is a highly noticeable portion and is a portion easy to attract eyes of a person who is outside the vehicle. For this reason, the moving direction of the electric vehicle 100 is displayed on the liquid crystal panels 77 of the wheel cover 270, whereby it is possible to allow a person who is outside the vehicle to more easily determine the moving direction of the electric vehicle 100.

Figure 12:
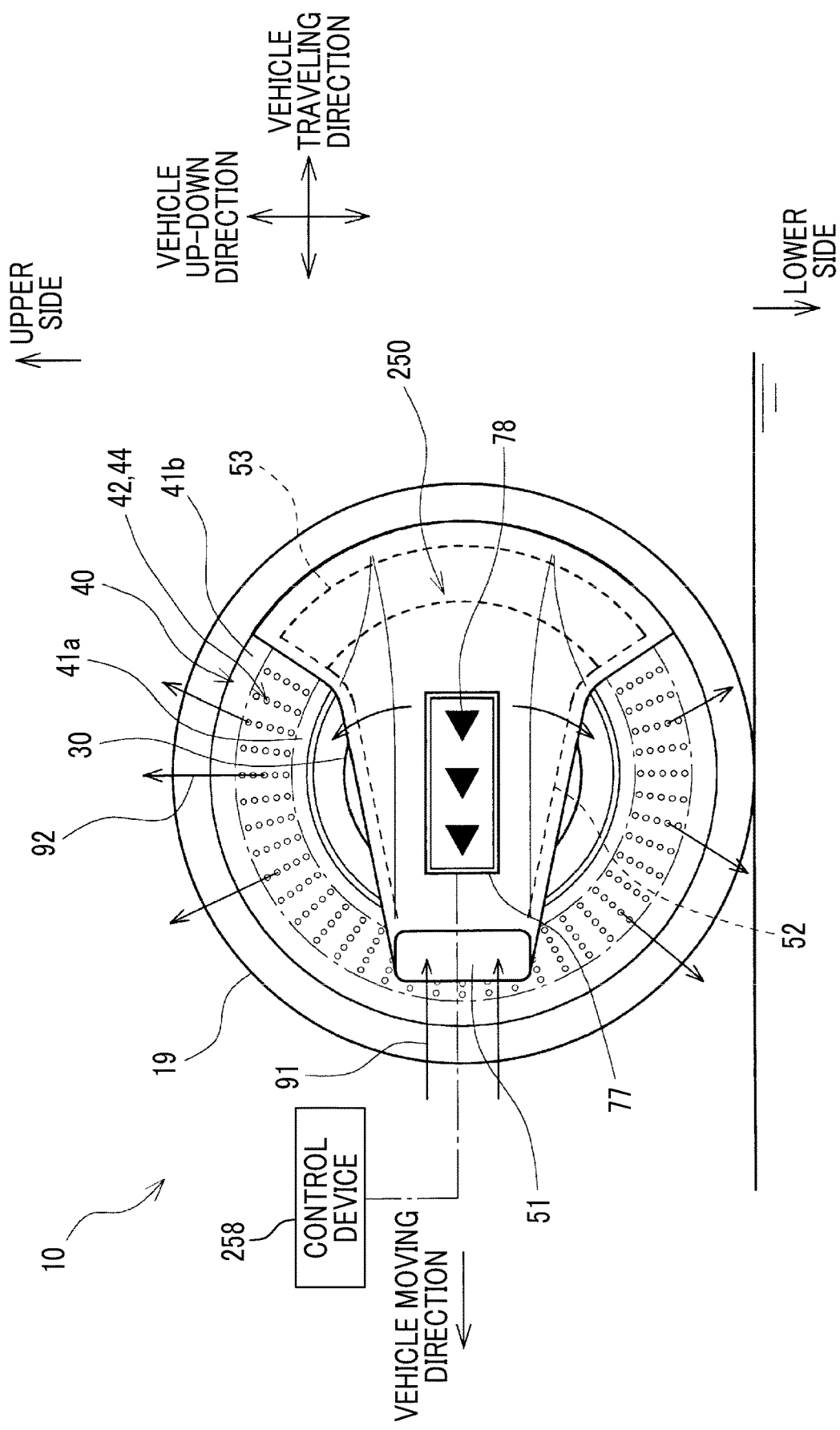
FIG. 12 is a side view of a drive unit for a vehicle including a wheel cover of still another embodiment.

Next, a wheel cover 250 of still another embodiment will be described referring to FIG. 12. In the wheel cover 250 of the embodiment, the wheel cover 50 described referring to FIGS. 2 to 5 is fixed to the shaft 11 to be not turned around the shaft 11, and liquid crystal panels 77 as display units that display images 78 indicating the moving direction of the electric vehicle 100 on the surface outward in the vehicle width direction instead of the marks 54 are provided. The liquid crystal panels 77 are connected to the control device 258, and display the images 78 in response to a command of the control device 258. The wheel cover 250 of the embodiment does not include the actuator 60. Since other configurations are the same as those of the wheel cover 50 of the embodiment described referring to FIGS. 2 to 5, the same portions are represented by the same reference numerals, and description will not be repeated.

Figure 11:
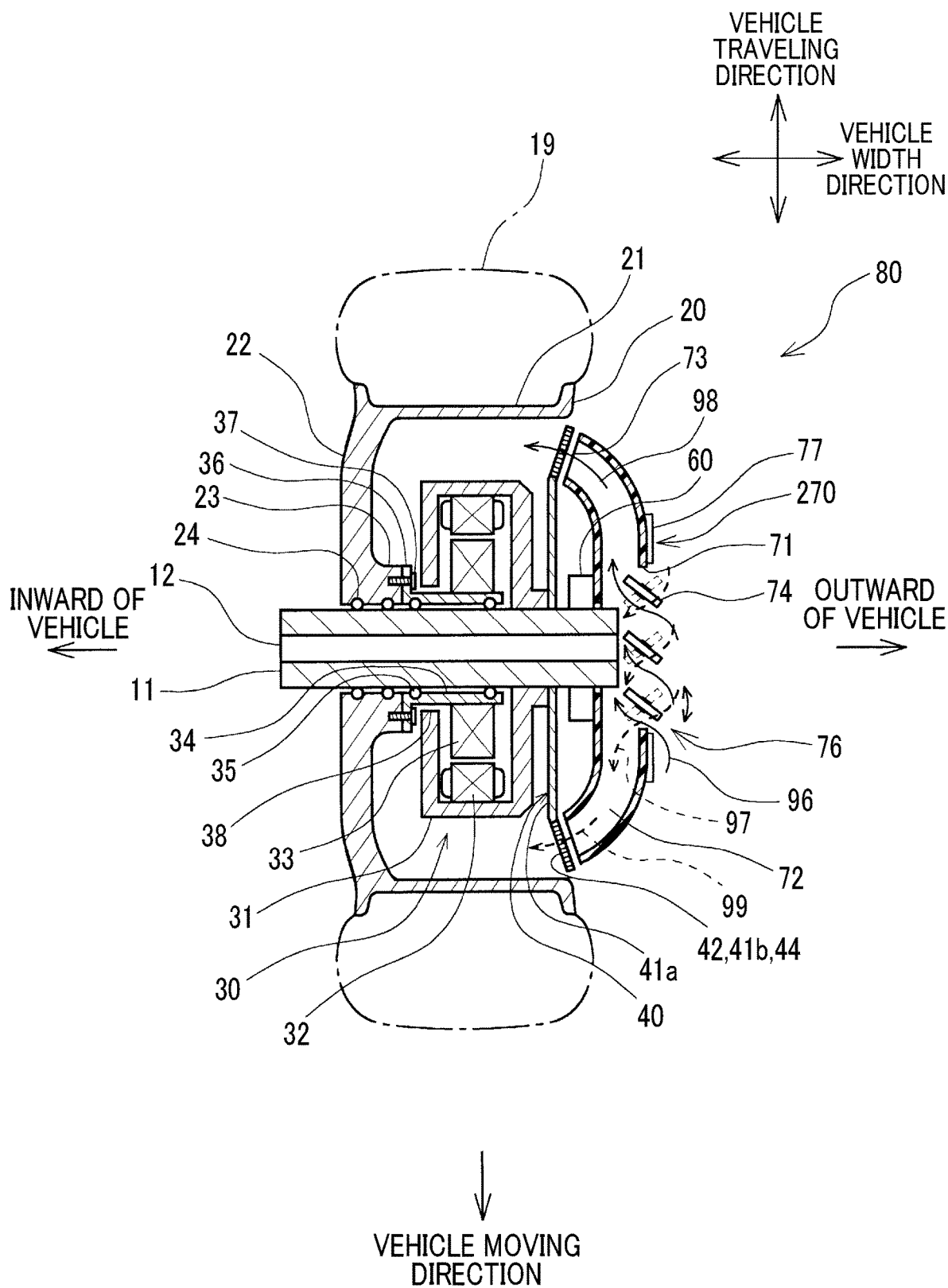
FIG. 11 is a sectional plan view of the drive unit for a vehicle including the wheel cover of still another embodiment shown in FIG. 10.

Like the wheel cover 270 of the embodiment described referring to FIGS. 10 and 11, the control device 258 displays the triangular images 78 indicating the moving direction of the electric vehicle 100 on the liquid crystal panels 77. When the electric vehicle 100 travels in a direction opposite to the state shown in FIG. 12, the control device 258 reverses the directions of the triangular images 78.

The wheel cover 250 has the same effects as the wheel cover 270 described above.

What is claimed is:

1. A wheel cover for a vehicle, the wheel cover being supported to be relatively rotatable with rotation of a wheel having a tire attached to an outer periphery of the wheel, wherein:
the wheel cover has a shape indicating a moving direction of a vehicle or a figure indicating the moving direction of the vehicle outward in a vehicle width direction; and
the wheel cover is configured to be turned by an actuator such that, when the moving direction of the vehicle is changed, the shape or the figure indicates the moving direction of the vehicle.

2. The wheel cover according to claim 1, comprising:
an intake port into which air flows; and
an intake air flow passage configured to introduce air flowing from the intake port into a space inward of the tire,
wherein the wheel cover is configured to be turned such that, when the moving direction of the vehicle is changed, the intake port is positioned in the moving direction of the vehicle and the shape or the figure indicates the moving direction of the vehicle.

3. The wheel cover according to claim 1, wherein:
the wheel is attached around a shaft non-rotatably attached to a vehicle body of the vehicle and is rotatable; and
the wheel cover is attached around the shaft and is configured to be turned by the actuator fixed to the shaft.

4. A drive unit for a vehicle, the drive unit comprising:
a bottomed cylindrical wheel including a cylindrical rim and a disc in contact with one end portion of the rim in an axial direction, a tire being attached to an outer periphery of the rim;
an in-wheel motor that is disposed in an internal space outward of the disc in a vehicle width direction; and
a wheel cover for a vehicle, the wheel cover being disposed outward of the in-wheel motor in the vehicle width direction and being supported to be relatively rotatable with rotation of the wheel, wherein:
the wheel cover has a shape indicating a moving direction of a vehicle or a figure indicating the moving direction of the vehicle outward in the vehicle width direction; and
the wheel cover is configured to be turned by an actuator such that, when a moving direction of the vehicle is changed, the shape or the figure indicates the moving direction of the vehicle.

5. The drive unit according to claim 4, wherein:
the wheel cover has an intake port into which air flows, and an intake air flow passage configured to introduce air flowing from the intake port into an internal space of the wheel; and
the wheel cover is configured to be turned such that, when the moving direction of the vehicle is changed, the intake port is positioned in the moving direction of the vehicle and the shape or the figure indicates the moving direction of the vehicle.

6. The drive unit according to claim 4, wherein:
the wheel is attached around a shaft non-rotatably attached to a vehicle body of the vehicle and is rotatable;
the in-wheel motor is fixed to the shaft and is configured to rotationally drive the wheel; and
the wheel cover is attached around the shaft and is configured to be turned by the actuator fixed to the shaft.

7. A drive unit for a vehicle, the drive unit comprising:
a bottomed cylindrical wheel including a cylindrical rim and a disc in contact with one end portion of the rim in an axial direction, a tire being attached to an outer periphery of the rim;
an in-wheel motor that is disposed in an internal space outward of the disc in a vehicle width direction; and
a wheel cover for a vehicle, the wheel cover being disposed outward of the in-wheel motor in the vehicle width direction and being non-rotatably supported, wherein:
the wheel cover has a louver configured to be able to change a direction of an opening, and an intake air flow passage configured to introduce air flowing from the opening into an internal space of the wheel;
the louver has, on a front surface and a rear surface, a figure indicating a moving direction of a vehicle; and
the wheel cover is configured to change the direction of the opening with an actuator such that, when the moving direction of the vehicle is changed, the direction of the opening is positioned in the moving direction of the vehicle and the figure indicates the moving direction of the vehicle.

8. The drive unit according to claim 7, wherein:
the wheel is attached around a shaft non-rotatably attached to a vehicle body of the vehicle and is rotatable;
the in-wheel motor is fixed to the shaft and is configured to rotationally drive the wheel;
the wheel cover and the actuator are fixed to the shaft; and
the louver is configured such that the direction of the opening is changed by the actuator.

9. A vehicle comprising:
a vehicle body; and
a wheel cover supported to be relatively rotatable with rotation of a wheel having a tire attached to an outer periphery of the wheel, wherein:
the wheel cover has a shape indicating a moving direction of the vehicle or a figure indicating the moving direction of the vehicle outward in a vehicle width direction;
the wheel cover is configured to be turned by an actuator such that, when the moving direction of the vehicle is changed, the shape or the figure indicates the moving direction of the vehicle; and
the vehicle body has a front-rear symmetrical appearance design.

10. The vehicle according to claim 9, wherein:
the wheel is attached around a shaft non-rotatably attached to the vehicle body and is rotatable; and
the wheel cover is attached around the shaft and is configured to be turned by the actuator fixed to the shaft.

* * * * *